May 13, 1930.  C. C. ABBOTT  1,758,775
HEAT DISSIPATING DEVICE
Filed March 27, 1926
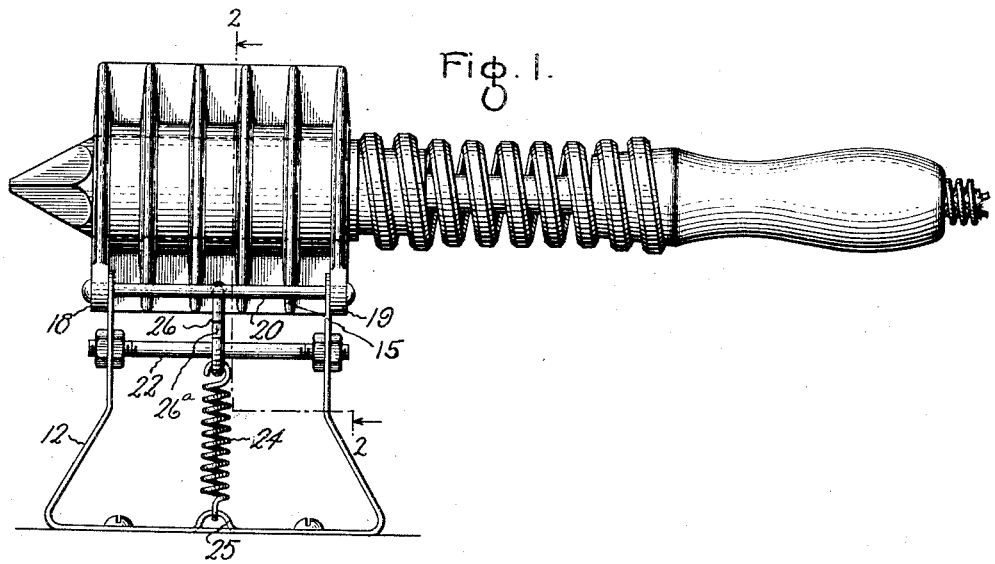
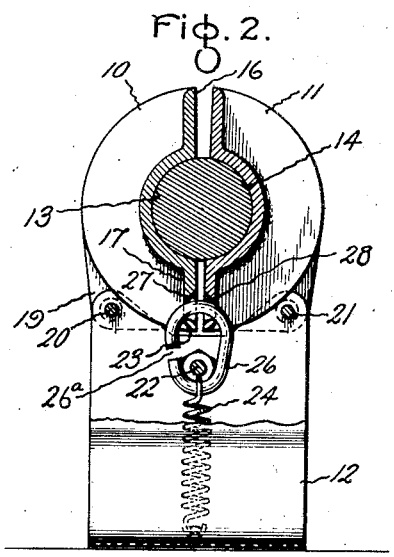
Inventor:
Charles C. Abbott,
by
His Attorney.

Patented May 13, 1930

1,758,775

UNITED STATES PATENT OFFICE

CHARLES C. ABBOTT, OF PITTSFIELD, MASSACHUSETTS, ASSIGNOR TO GENERAL ELECTRIC COMPANY, A CORPORATION OF NEW YORK

HEAT-DISSIPATING DEVICE

Application filed March 27, 1926. Serial No. 98,041.

My invention relates to heat dissipating means for self-contained heating devices, and has for its object the provision of simple, reliable and efficient means for dissipating heat from the device when it is not in use, so as to maintain the device at a desired normal working temperature.

Although my invention has application to various self-contained heating devices wherein the heating means forms a part of the device itself, regardless of the particular type of heating means used, whether gas, electricity, etc., it has particular application to electrically heated soldering irons.

In the operation of various kinds of electrically heated devices such as flatirons, soldering irons and the like, if the device be allowed to remain idle with the current turned on, its temperature will rise, and if left for a considerable period of time its temperature may eventually result in damage to the device itself. This is a particular disadvantage if the device is being used intermittently, it being desired to have the device ready for use when required at the most efficient operating temperature. Various temperature control devices have been used for controlling the heating circuit. Such control devices, however, are expensive and also to some extent unreliable. In my copending application, Serial No. 657,773, filed August 16, 1923, of which this application is an improvement, I have described and claimed heat dissipating means whereby the heated device is maintained at a desired working temperature when not in use.

In carrying out my present invention, I provide two resiliently movable heat dissipating members between which the soldering iron may be inserted when not in use.

For a more complete understanding of my invention, reference should be had to the accompanying drawing, in which Fig. 1 is a side elevation view of a heat dissipating device for electrically heated soldering irons embodying my invention showing a soldering iron in position therein, while Fig. 2 is a sectional view along the line 2—2 of Fig. 1 looking in the direction of the arrows.

Referring to the drawing, I have shown my invention in one form as adapted to an electric soldering iron, although it may obviously be arranged for use in connection with various other devices such as electric flatirons, electric curling irons and the like. In the particular form shown, the device comprises two semi-cylindrical members 10 and 11, which are pivotally mounted on a support 12 in the manner of a pair of jaws. The two members 10 and 11 are castings of a material having suitable thermal conductivity, such as brass, and are similar in construction. They are provided with registering substantially semi-cylindrical grooves 13 and 14 extending in a substantially horizontal direction, which together form a cylindrical bore to receive the soldering iron. In order to increase the rate of heat dissipation, the members are each provided with a plurality of disk-like vanes 15 which extend outward radially with respect to the center line of the grooves 13 and 14, to which the planes of the vanes are perpendicular, and are substantially semicircular in form. At their ends the vanes are joined by integral cross webs 16 and 17. The two vanes at the ends, respectively, of the heat dissipating members are provided with extensions 18 and 19 which are provided with apertures to receive horizontal pivot pins 20 carried by the support 12, whereby the heat dissipating members are pivoted on the support. Although the reference numerals have been used with reference to member 10 to a large extent, it will be understood that the member 11 is similar in construction, it being mounted on a horizontal pivot pin 21.

The support 12 consists of a metal strip having its ends turned upward and secured in a predetermined spaced relation by means of a cross bar 22. The two pivot pins 20 and 21 extend between opposite sides of the upper ends of the support. The ends of the support are cut away in the middle, as indicated at 23 (Fig. 2), to provide space for the two heat dissipating members to be moved on their pivots toward each other. A helical spring 24 is provided for biasing the heat dissipating members toward each other. This spring has its lower end secured to the support 12 at a substantially central point 25 and its upper end provided with a hook which interlinks with the lower end of a link 26, the upper end of which passes through apertures 27 and 28 in the lower sides, respectively, of the two heat dissipating members 10 and 11. These apertures are provided in the lower cross webs 17 of the two heat dissipating members. The link 26 is open at one side, it being provided with a gap 26ª. This gap is of such width as to permit the upper end of the link to be slipped easily through the apertures 27 and 28.

The upper end of the link 26 has such a curvature, preferably an arc of a circle, that the members 10 and 11 are free to move away from each other to a limited extent on their pivots 20 and 21. For the purpose of assuring this limited freedom of movement of the members 10 and 11, the orifices of the apertures 27 and 28 are bevelled at their inner ends, that is, the ends of the apertures adjacent each other, so as to form substantially knife-edged bearings for the upper end of the link 26. This construction allows the heat dissipating members to move freely on their pivots, it being understood, of course, that this movement is limited in extent. The lower end of the link 26 may be and is shown as having a somewhat smaller radius of curvature than the upper end.

In using the device, the cylindrical soldering iron is forced into the bore formed by the grooves 13 and 14, the two heat dissipating members 10 and 11 being thereby separated somewhat against the tension of the spring 24 as indicated in Fig. 2. The curvature of the semi-cylindrical grooves 13 and 14 will be substantially the same as the outside curvature of the soldering iron, but these grooves in a transverse direction will be somewhat less than semi-circles, as indicated in Fig. 2, and since the two members 10 and 11 are normally held together by the spring 24, the insertion of the soldering iron separates them. It is preferable that the two grooves 13 and 14 be nearly semi-circular in a transverse direction, so that the soldering iron will be in actual engagement with the heat dissipating members throughout the greatest possible extent of its surface whereby the dissipation of heat is facilitated.

The spring 24 applies a force sufficient to assure good thermal contact between the heat dissipating members and the soldering iron. This thermal relation is further assured by the fact that the insertion of the soldering iron between the two members produces a sliding contact whereby the contacting surfaces are wiped clean. I have found that where brass heat dissipating members are used an alloying action apparently takes place between the metal of the heat dissipating members and the copper of the soldering iron whereby a heat resisting surface alloy seems to be formed on the soldering copper which tends to appreciably prolong its life.

While I have described my invention as embodied in concrete form and as operating in a specific manner in accordance with the provisions of the patent statutes, it should be understood that I do not limit my invention thereto, since various modifications thereof will suggest themselves to those skilled in the art, without departing from the spirit of my invention, the scope of which is set forth in the annexed claims.

What I claim as new, and desire to secure by Letters Patent of the United States, is:

1. Heat dissipating means comprising normally relatively movable members arranged to closely engage with a heated device inserted between them, resilient means for holding said members in engagement with the heated device, and means for dissipating heat from said members.

2. Cooling means for electric soldering irons comprising pivotally mounted cooperating members arranged to closely engage a soldering iron inserted between them, resilient means for holding said members together, and means for dissipating heat from said members.

3. A cooling stand for electric soldering irons comprising pivotally mounted semi-cylindrical members having registering recesses providing a bore adapted to receive a soldering iron inserted between said members, elastic means tending to force said members together, and heat radiating vanes on said members.

4. A cooling stand for electric soldering irons comprising a pair of heat dissipating members having registering recesses providing a bore to receive the soldering iron, a support, pivotal connections between said members and said support, and a spring attached to said members between said pivotal connections, said spring applying a force tending to move said members together and thereby hold said members in good heat conducting relation with a soldering iron inserted between them.

5. A holder for a soldering iron, comprising a plurality of relatively movable heat radiating members, and means for causing said members to engage the soldering iron when inserted in the holder.

In witness whereof, I have hereunto set my hand this 24th day of March, 1926.

CHARLES C. ABBOTT.